United States Patent
Younkin et al.

(10) Patent No.: US 7,305,286 B1
(45) Date of Patent: Dec. 4, 2007

(54) SYSTEM AND METHOD FOR GYRO ENHANCED VERTICAL FLIGHT INFORMATION

(75) Inventors: James R. Younkin, Springdale, AR (US); Charles R. Bilbe, Fayetteville, AR (US)

(73) Assignee: TruTrak Flight Systems, Inc., Springdale, AR (US)

( * ) Notice: Subject to any disclaimer, the term of this patent is extended or adjusted under 35 U.S.C. 154(b) by 0 days.

(21) Appl. No.: 11/263,564

(22) Filed: Oct. 31, 2005

Related U.S. Application Data (63) Continuation of application No. 11/049,094, filed on Feb. 2, 2005, now Pat. No. 6,961,643.

(51) Int. Cl.
G05D 1/00 (2006.01)
G05D 1/08 (2006.01)
G05D 3/00 (2006.01)
G06F 7/00 (2006.01)
G06F 17/00 (2006.01)

(52) U.S. Cl. .............. 701/7; 701/11; 701/14; 701/15; 701/16; 701/207; 244/3.2; 244/171; 244/177; 244/181; 702/150; 702/151

(58) Field of Classification Search ........ 701/3–7, 701/11, 14, 15, 16, 200, 207; 244/177, 194, 244/3.2, 3.16, 321, 171; 73/170.01, 178 R; 702/150, 151; 33/328
See application file for complete search history.

(56) References Cited

U.S. PATENT DOCUMENTS

| | | | | |
|---|---|---|---|---|
| 3,640,137 A | * | 2/1972 | Allen et al. ............. 74/5.34 |
| 4,003,655 A | * | 1/1977 | Wasilko ................ 356/4.01 |
| 4,109,886 A | * | 8/1978 | Tribken et al. .............. 244/178 |
| 4,244,215 A | * | 1/1981 | Frosch et al. ............. 73/178 R |
| 4,303,978 A | * | 12/1981 | Shaw et al. ................. 701/220 |
| 4,326,189 A | * | 4/1982 | Crane ......................... 340/973 |
| 4,387,430 A | * | 6/1983 | Verzella et al. ............... 701/12 |
| 4,387,431 A | * | 6/1983 | Wright et al. ................. 701/12 |
| 4,387,513 A | * | 6/1983 | Cowdin ......................... 33/322 |
| 4,417,308 A | * | 11/1983 | Wright et al. ................. 701/12 |
| 4,646,255 A | * | 2/1987 | Ebert et al. ................... 703/8 |
| 4,860,007 A | | 8/1989 | Konicke et al. |
| 5,136,301 A | | 8/1992 | Bechtold et al. |
| 5,412,382 A | | 5/1995 | Leard |
| 5,574,650 A | * | 11/1996 | Diesel ......................... 701/220 |
| 5,749,540 A | * | 5/1998 | Arlton ...................... 244/17.13 |

(Continued)

OTHER PUBLICATIONS

Graham, Richard, "SR-71 Revealed, The Inside Story" Motorbooks International, Jul. 7, 1996, p. 73.

*Primary Examiner*—Thomas Black
*Assistant Examiner*—Jorge O Peche
(74) *Attorney, Agent, or Firm*—James Richards (57) ABSTRACT

A flight instrument and associated method where vertical speed information is combined with gyro information to produce gyro enhanced vertical speed information that is displayed to a pilot. The gyro information may include a pitch rate gyro and may include an azimuth rate gyro. The pitch rate gyro and azimuth rate gyro may be combined to yield a corrected pitch rate in turns. In one embodiment, the display is an airplane symbol that moves relative to a horizon line responsive to the gyro enhanced vertical speed information. The horizon line may also tilt in response to the azimuth rate gyro.

11 Claims, 8 Drawing Sheets

U.S. PATENT DOCUMENTS

| | | |
|---|---|---|
| 5,844,504 A | 12/1998 | Etherington |
| 5,886,257 A * | 3/1999 | Gustafson et al. ........ 73/178 R |
| 5,978,715 A * | 11/1999 | Briffe et al. .................. 701/11 |
| 6,057,786 A | 5/2000 | Briffe et al. |
| 6,111,525 A | 8/2000 | Berlioz et al. |
| 6,389,333 B1 * | 5/2002 | Hansman et al. ............... 701/3 |
| 6,405,107 B1 * | 6/2002 | Derman ......................... 701/3 |
| 6,456,905 B2 * | 9/2002 | Katz et al. ..................... 701/4 |
| 6,573,841 B2 | 6/2003 | Price |
| 6,702,229 B2 | 3/2004 | Anderson et al. |
| 6,865,453 B1 | 3/2005 | Burch et al. |
| 6,867,711 B1 | 3/2005 | Langner et al. |
| 6,885,313 B2 | 4/2005 | Selk et al. |
| 6,961,643 B1 * | 11/2005 | Younkin et al. ............... 701/7 |
| 6,985,091 B2 | 1/2006 | Price |
| 7,091,881 B2 | 8/2006 | Judge et al. |

* cited by examiner

SYSTEM AND METHOD FOR GYRO ENHANCED VERTICAL FLIGHT INFORMATION

RELATED APPLICATIONS

This application is a continuation of prior application Ser. No. 11/049,094, titled "System and Method for Gyro Enhanced Vertical Flight Information," filed Feb. 2, 2005 now U.S. Pat. No. 6,961,643 by Younkin et al., which is incorporated herein by reference in its entirety.

BACKGROUND

1. Field of the Invention

The present invention pertains to the field of aircraft flight control and instrumentation, more particularly to the field of vertical, or pitch axis control and instrumentation.

2. Background of the Invention

Aircraft flight control is a complex activity involving the management of information from numerous instruments that keep track of aircraft flight states including three axes of position and velocity, three axes of aircraft attitude, wind, engine and airframe configuration, flaps, trim. For proper, efficient, and safe flight, the pilot must keep track of and manage all of this information, often in a rapidly changing environment.

A pilot typically manages the vertical axis of an aircraft by reference to a vertical gyro as the primary vertical axis instrument. The vertical gyro presents pitch attitude, which the pilot observes in order to steer the elevator of the aircraft. To maintain level flight and hold altitude, the pilot iteratively adjusts aircraft pitch attitude to a value that is expected to yield the desired flight path and then monitors the altimeter and vertical speed indicator, airspeed indicator and other instruments. As errors creep in, the pilot adjusts the aircraft attitude to fly back to the desired path. Thus, the pilot must constantly monitor the vertical gyro, altimeter, airspeed, and if available, the vertical speed indicator, scanning frequently among them to maintain the desired flight path. Further, the pilot must maintain the pitch axis while maintaining the roll axis, maintaining navigation updates, observing engine instruments, and keeping in radio contact with flight control. Thus, maintaining the vertical axis potentially contributes significantly to the pilots work load and fatigue.

Reducing pilot fatigue and increasing air safety, potentially comes at a cost. Precision aircraft instruments can be expensive to acquire, install, and maintain. Providing flight instruments, even for non-instrument VFR (visual flight rules) flying can improve flight safety by having instruments available for the occasional unanticipated and unavoidable need for instrument flying. Further, air safety can be improved by including redundant instruments, enabling an alternate source of critical information in the case of failure of a particular instrument. Adding redundant instruments, or even equipping an aircraft for instrument flying can be expensive. Thus, techniques that enable the production of low cost flight instruments can materially improve flight safety by encouraging the wider installation and use of flight instruments.

Therefore, there is a need for flight instruments that provide efficient display of flight information to reduce pilot work load and fatigue. Further, there is a need for flight instruments based on low cost sensors to enable higher quality flight control at lower cost, improving overall flight safety.

BRIEF DESCRIPTION OF THE INVENTION

Briefly, the present invention includes a flight instrument and associated method where vertical speed information is combined with gyro information to produce gyro enhanced vertical speed information that is displayed to a pilot. The gyro information may include a pitch rate gyro and may include an azimuth rate gyro. The pitch rate gyro and azimuth rate gyro may be combined to yield a corrected pitch rate in turns. In one embodiment, the display is an airplane symbol that moves relative to a horizon line responsive to the gyro enhanced vertical speed information. The horizon line may also tilt in response to the azimuth rate gyro.

In another embodiment, a vertical flight dynamic sensor is stabilized using pitch rate gyro information combined with azimuth rate gyro information corrected by scaling the azimuth rate gyro information in accordance with feedback derived from the difference between the vertical flight dynamic sensor signal and the corrected vertical flight dynamic output. In one embodiment, the vertical flight dynamic sensor may be a vertical speed sensor. In another embodiment, the vertical flight dynamic sensor may be a pitch attitude sensor derived from the difference between an inertial based acceleration signal and a velocity based acceleration signal. The velocity based acceleration signal may be based on airspeed or GPS velocity.

BRIEF DESCRIPTION OF THE FIGURES

The present invention is described with reference to the accompanying drawings. In the drawings, like reference numbers indicate identical or functionally similar elements. Additionally, the left most digit(s) of a reference number identifies the drawing in which the reference number first appears.

DETAILED DESCRIPTION OF THE PREFERRED EMBODIMENTS

The invention is a system and method for generating gyro enhanced vertical information (also called gyro stabilized vertical speed.) In one embodiment, the vertical information is vertical speed information. In another embodiment, the vertical information is pitch attitude information.

The combination of gyro based pitch attitude information and vertical speed information in a single signal in accordance with the present invention results in a display that simplifies the task of flying an aircraft and reduces pilot work load and fatigue.

The invention presents a stabilized, flyable vertical speed display, free of the lag that is present in a pure vertical speed display. Without gyro stabilization, a vertical speed display includes too much lag to be used to directly control an aircraft. The lag results from at least two sources: the mass of the aircraft must be accelerated to a new vertical speed in response to an attitude control input, and the vertical speed sensor itself may have a lag in its response. If the pilot uses lagged vertical speed alone to control the aircraft, the pilot will typically over control, alternately pitching up too much and overcorrecting by pitching down too much, resulting in a hunting or oscillating maneuver that is at least uncomfortable, and potentially dangerous. But, by using gyro stabilized vertical speed, the pilot may fly directly according to the indicator without over controlling, resulting in smooth, stable flight.

Flying according to gyro enhanced vertical speed removes one layer of mental activity involved in flying the aircraft. Using conventional instruments, the pilot adjusts pitch attitude repetitively with reference to a vertical gyro and a vertical speed indicator in order to achieve a desired vertical speed. Using a gyro enhanced vertical speed indicator, the pilot simply adjusts the pitch attitude of the aircraft until the display shows the desired vertical speed. Thus the use of gyro enhanced vertical speed reduces the scanning effort, reduces the number of instruments that need to be scanned, and reduces the frequency of scanning, reducing pilot workload and reducing pilot fatigue.

An instrument displaying gyro enhanced vertical speed can potentially replace the vertical gyro as the primary vertical flight instrument, leaving the vertical gyro for backup or cross check use.

Gyro enhanced vertical speed may be produced using economical sensors. In accordance with one embodiment of the invention, two strap down rate gyros and one economical pressure altitude sensor are required. One of the rate gyros may also be used for a turn and bank, so that when turn and bank is provided only one additional gyro, the pitch rate gyro is needed. The pressure altitude sensor may be economical the altitude sensor does not have to be precisely calibrated for altitude display.

In accordance with the invention, a feedback signal based on the difference between the vertical speed sensor and the displayed vertical speed is used to scale an azimuth rate signal to correct the pitch rate gyro signal in turns. The feedback correction enables low cost design with minimum number of sensors for more reliable operation.

The design includes inherent safety properties because the display is based on instantaneous sensors and can recover rapidly from out of range operation. A pilot should not intentionally exceed 45 degrees roll, but the instrument can recover in a few seconds even from extreme inverted attitude. Some conventional gyros may hit limit stops that cause deflections requiring several minutes to recover.

The potential low cost of an instrument in accordance with the present invention improves flight safety by enabling instrument flight in more aircraft and enables redundant instruments in more aircraft. Flight safety is further improved through a reduction in pilot workload and fatigue.

Figure 1:
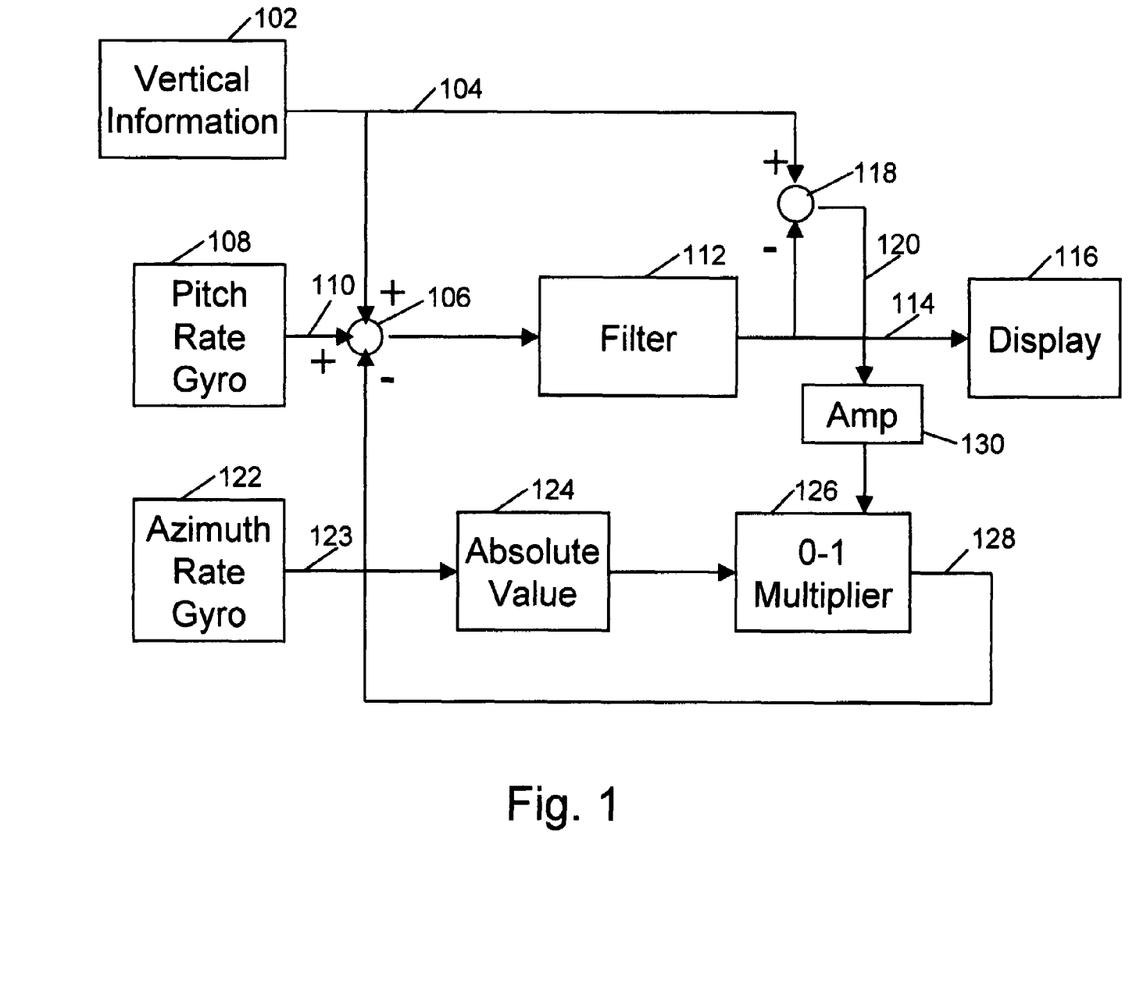
FIG. 1 is an exemplary block diagram of a system providing gyro enhanced vertical information in accordance with the present invention.

FIG. 1 is an exemplary block diagram of a system providing gyro enhanced vertical information in accordance with the present invention. The invention will first be described wherein the vertical information is vertical speed information as from a pressure altitude based vertical speed sensor. Referring to FIG. 1, the vertical speed sensor 102 produces a vertical speed signal 104, which is summed with a pitch rate gyro enhancement signal 110 and a correction signal 128. The summed result is processed by a filter 112 to produce a gyro enhanced vertical speed signal 114 (also called filtered signal.) The gyro enhanced vertical speed signal 114 is used to control a display 116, where the signal 114 may be observed by the pilot and used to control an aircraft. Alternatively, the signal 114 may be included in an autopilot system for control of the aircraft (not shown.)

Vertical speed information 102, by itself, is difficult to use to fly an aircraft because vertical speed information 102 lags significantly behind the pitch control action used to control the vertical axis. By combining pitch rate gyro information 110 with vertical speed information 104 using a complementary filter, the fast responding pitch rate gyro information 110 may be used to place the aircraft in an attitude that will result in the desired vertical speed. The longer term vertical speed information 104 will then indicate the achieved vertical speed.

For straight and level flying, vertical speed 114 and pitch rate gyro information 110 are sufficient; however, in a turn, the pitch rate gyro 108 is also responsive to the turn rate. In fact, the pitch rate gyro 114 is responsive to the azimuth rate multiplied by the sine of the bank angle. The azimuth rate response is undesired in the pitch axis display. If not corrected, the azimuth rate component of the pitch rate gyro signal 110 would add to the displayed vertical speed, producing an excessively high vertical speed indication, causing the pilot to pitch down and lose altitude.

Thus, a correction signal 128 is subtracted from the pitch rate gyro signal 110 to remove the azimuth rate response component of the pitch rate gyro signal 110. The correction signal 128 is produced by scaling the absolute value 124 of an azimuth rate gyro signal 123 by a difference signal 120. The difference signal 120 is the difference between the displayed gyro enhanced vertical speed signal 114 (filtered signal 114) and the vertical speed signal 104 from the vertical speed sensor 102.

The azimuth rate gyro 122 is typically a strap down rate gyro responsive to the yaw axis of the aircraft. More precisely, the azimuth rate gyro 122 is responsive to the azimuth rate multiplied by the cosine of the bank angle. One advantage of the present invention is that the precise bank angle does not need to be known. The feedback 120 determines the correct amount of azimuth rate gyro information to be subtracted from pitch rate gyro information to yield a correct steady state vertical axis signal. The feedback also compensates for variations in the sensitivity of the azimuth rate gyro. The gain in the feedback loop may be set by an amplifier 130.

Since the system can tolerate variation in the sensitivity of the azimuth rate gyro, the azimuth rate gyro may be an inclined rate gyro as used in a turn coordinator or turn and bank. An inclined angle of 20 to 40 degrees may be used in a turn and bank to provide roll response in anticipation of azimuth response. Such roll response is not adverse to the operation of the vertical speed information in accordance with the present invention. In one embodiment, turn and bank information and vertical speed information may be displayed to the pilot in the same instrument.

As a further advantage resulting from the feedback correction, the system can tolerate variations in instrument panel tilt. Aircraft instrument panels may tilt from one aircraft model to another in the range of zero to eight degrees. The tilt potentially alters the amount of azimuth rate signal required to correct pitch rate in a turn, but the feedback correction automatically adjusts without requiring the instrument installer to make adjustments—simplifying installation and improving reliability.

The multiplier 126 may be a gain controlled amplifier, a multiplier, a duty cycle controlled pulse width modulator or other multiplying function. In a digital embodiment, the multiplier 126 typically includes a multiply operation. In one embodiment, the feedback is used to vary the gain of the multiplier 126 from a nominal value. For example, zero difference may command a nominal gain value of, for example, 50% gain. A positive difference may increase the gain, and a negative difference may decrease the gain. In another embodiment, the gain may be limited to a range, for example zero to one.

The filter 112 is typically a lag filter. In one embodiment, the filter 112 is a single pole lag filter with a time constant of 5 seconds. Other multipole filters may be used. The filter 112 acts as a complementary filter, mixing short term pitch rate gyro information 110 with long term vertical speed information 104. The filter 112 also integrates pitch rate gyro information 110 to generate pitch attitude angle information. The pitch angle information then decays according to the time constant of the filter. Thus, the filtered output 114 is responsive to the pitch angle information, decaying at the time constant of the filter 112 and is responsive to the vertical speed information 104 lagged by the time constant of the filter 112. Thus, the short term response is primarily to the gyro based information 110 and the long term response is primarily to the vertical speed information 104. The operation of the filter may be better understood with reference to FIG. 2.

FIG. 2A-FIG. 2E illustrate the filter response to various exemplary vertical speed and pitch rate gyro signals. Each of the waveforms in FIGS. 2A-2E are shown using a common time axis 204 for comparison of the signals.

Figure 2A:
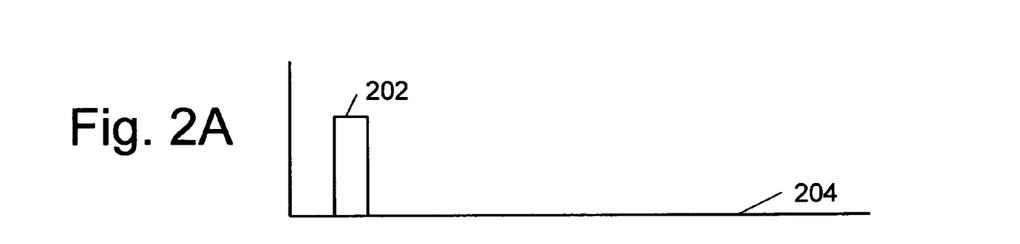
FIG. 2A-FIG. 2E illustrate the filter response to various exemplary vertical speed and pitch rate gyro signals.
Figure 2B:
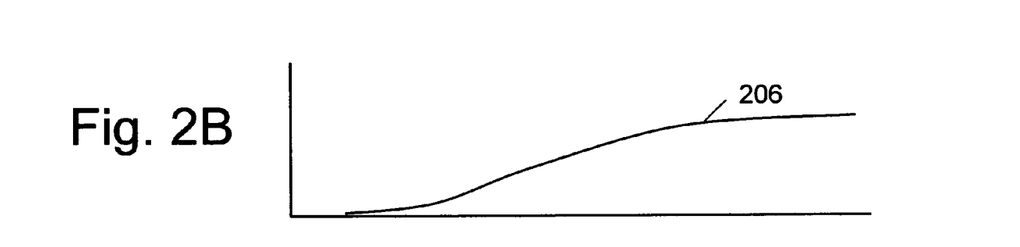

FIG. 2A illustrates an exemplary output 110, 202 of the pitch rate gyro 108 for a pitch rotation of one degree per second for one second. FIG. 2B illustrates an exemplary vertical speed output 104, 206 resulting from the pitch rotation of FIG. 2A. The vertical speed of the aircraft is initially delayed relative to the control input because the aircraft mass must be accelerated to the new vertical speed. Also, vertical speed sensors may include additional lag in the sensing and display of vertical speed and in the filtering of noise in the vertical speed signal. Because of the lag in indicated vertical speed 206, flying the pitch axis of an airplane on vertical speed alone is very difficult. A pilot would tend to over control, resulting in severe hunting or oscillating maneuvers. At best, if the pilot can avoid over controlling, extreme concentration is required, reducing attention to other flight instruments and increasing pilot fatigue.

Figure 2C:
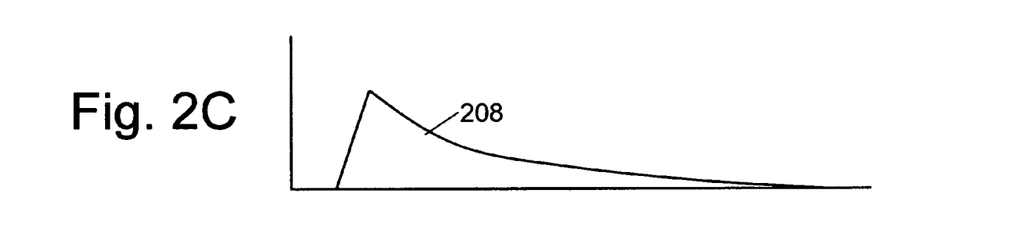

FIG. 2C illustrates the output of the filter 114, 208 in response to the pitch rate gyro signal 202 of FIG. 2A. Note the initial ramp as the pitch rate gyro signal is integrated, resulting in a pitch angle signal. The pitch angle signal decays in accordance with the decay rate of the filter.

Figure 2D:
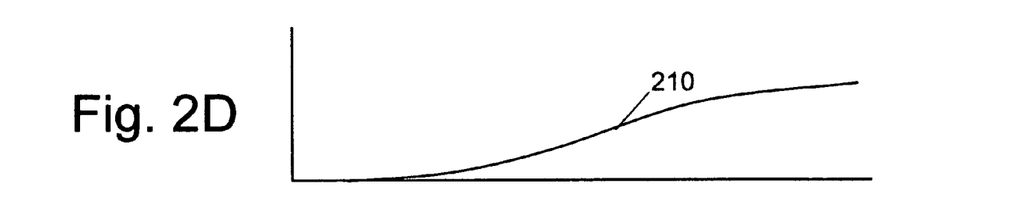

FIG. 2D illustrates the filter output 114, 210 resulting from the vertical speed signal 206 of FIG. 2B. The filter output 210 is the vertical speed signal of FIG. 2B lagged in accordance with the time constant of the filter.

Figure 2E:
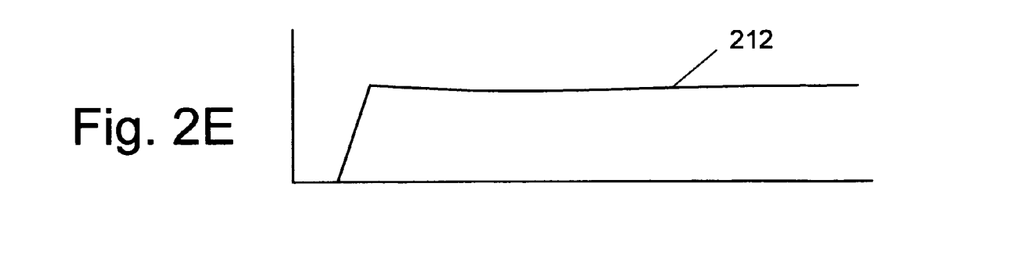

FIG. 2E illustrates the filter response to an exemplary maneuver including the response to the pitch rate gyro signal 202 of FIG. 2A and the resulting vertical speed signal 206 of FIG. 2B. The signal 212 shown in FIG. 2E is the sum of FIGS. 2C and 2D. FIG. 2E initially follows the ramp of FIG. 2C showing the change in pitch attitude. As the output response 208 to pitch attitude decays, the response 210 to vertical speed increases, maintaining a substantially constant response output 212. Note that the sensitivity to pitch angle 208 is adjusted to indicate the expected vertical speed for the given pitch angle.

The resulting signal 114, 212 is a gyro enhanced vertical speed signal 114, absent the lag associated with the pure vertical speed signal 206. The gyro enhanced vertical speed signal 114 may be used by a pilot much as a pilot would use an attitude signal from a vertical gyro, resulting in stable flight, free from hunting and oscillation. Gyro enhanced vertical speed 114 has the additional advantage that the display 116 indicates the vertical speed associated with the current aircraft attitude, simplifying the task of observing and coordinating multiple instruments to fly a desired vertical speed.

Figure 3:
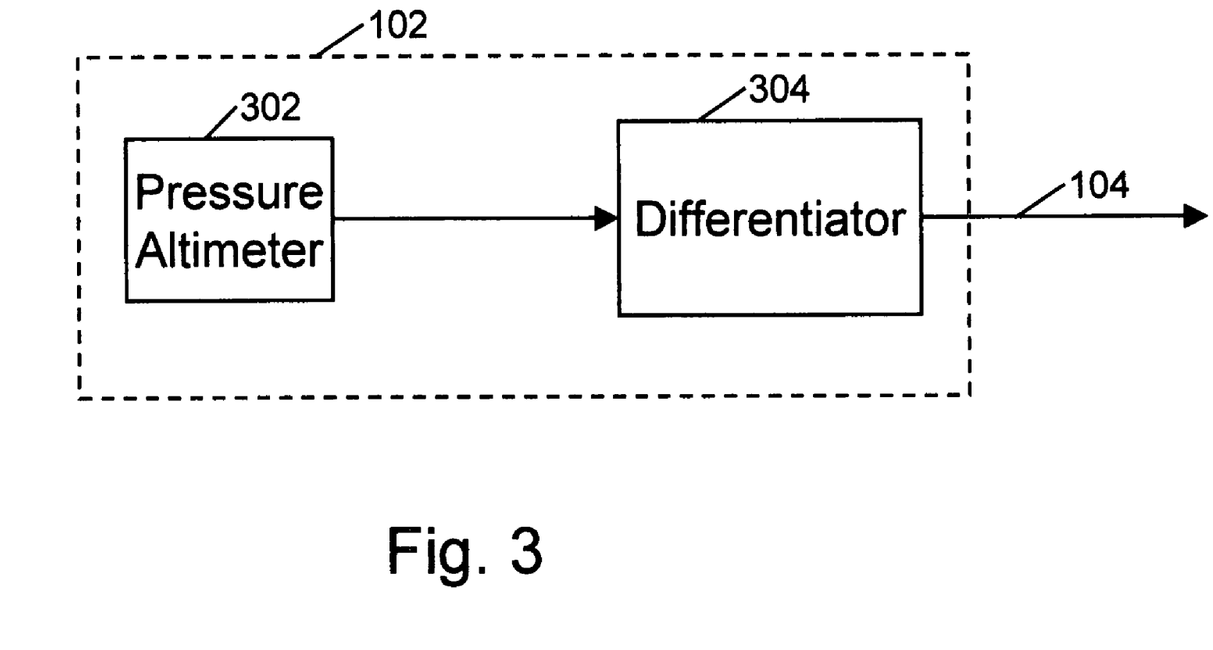
FIG. 3 shows one embodiment of a vertical flight information sensor as used by the present invention.

FIG. 3 shows one embodiment of a vertical flight information sensor as used by the present invention. In the embodiment shown in FIG. 3, the vertical flight information sensor 102 is a vertical speed sensor. As shown, the vertical speed signal 104 is derived from a pressure altimeter 302 by differentiating the pressure altitude signal in a differentiator 304 (also called a rate network 304) to derive a vertical speed signal 104, (also called a vertical rate signal 104.)

Figure 4:
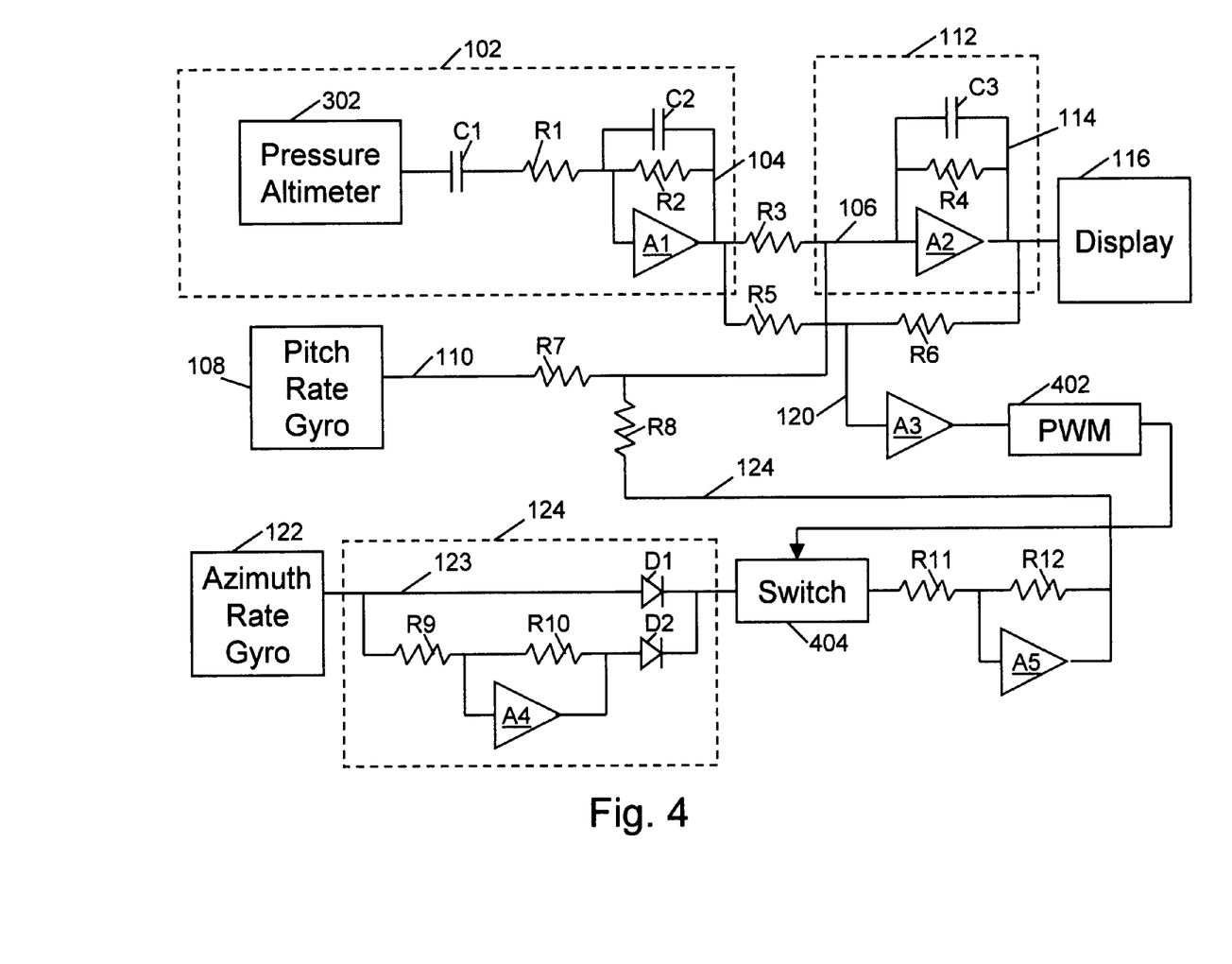
FIG. 4 is a schematic diagram for an exemplary analog embodiment of the present invention.

FIG. 4 is a schematic diagram for an exemplary analog embodiment of the present invention. Referring to FIG. 4, the vertical information sensor 102 is a vertical speed sensor comprising a pressure altitude sensor 302 and a differentiating network 304, also called a rate network. The rate network comprises C1, R2 and amplifier A1. Amplifier A1 is an op amp with the +input connected to a bias reference (not shown). Thus, C1, R2 and A1 form a differentiating amplifier, with the output proportional to the rate of change of the input. R1 and C2 serve to reduce the magnitude of high frequency noise. In one embodiment, the time constant for C2, R2 is 0.5 second. The summing node 106 is at the input to A2, summing the vertical speed signal 104, the pitch rate gyro signal 110, and the correction signal 124. A2 and feedback network C3, R4 form the filter 112. In one embodiment, the time constant, C3, R4 is 5 seconds. The filter output 114 may drive a display 116 or may be used in an autopilot. A feedback error signal 120 is generated at the junction of R5 and R6. R5 and R6 are in the same ratio as R3 and R4 to compare the vertical speed signal 104 and the filter output signal 114. The comparison result 120 is buffered by A3 (A3 has a finite gain, for example: one) and used to control the duty cycle of a pulse width modulator (PWM) 402.

The output 123 of the azimuth rate gyro 122 is rectified by the absolute value circuit 124 comprising R9, R10, A4, D1 and D2. The rectified pitch rate gyro signal is modulated by the switch 404 according to the duty cycle of the PWM 402 and amplified by R11, R12 and A5 to generate the correction signal 124. The average value of the correction signal is proportional to the duty cycle of the PWM and proportional to the absolute value of the azimuth rate gyro and therefore proportional to the product of the absolute value of the azimuth rate gyro signal 123 and the difference 120 between the vertical speed signal 104 and the filtered output signal 114.

In the schematic of FIG. 4, the amplifiers A1, A2, A4 and A5 are negative gain op amp type amplifiers with the positive input of the amplifier tied to a bias reference, such as ground. Amplifier A3 is a finite gain buffer. In practice, the circuit of FIG. 4 may include other high frequency roll off networks to reduce noise.

The feedback path gain comprising A3 and the sensitivity of the PWM should be kept low—just high enough to provide good operation. If the gain is too low, the pilot may gain or lose altitude in turns. If the gain is too high, the vertical information 104 (vertical speed signal) will dominate the output 114 prematurely, introducing lag into the output 114.

Figure 5:
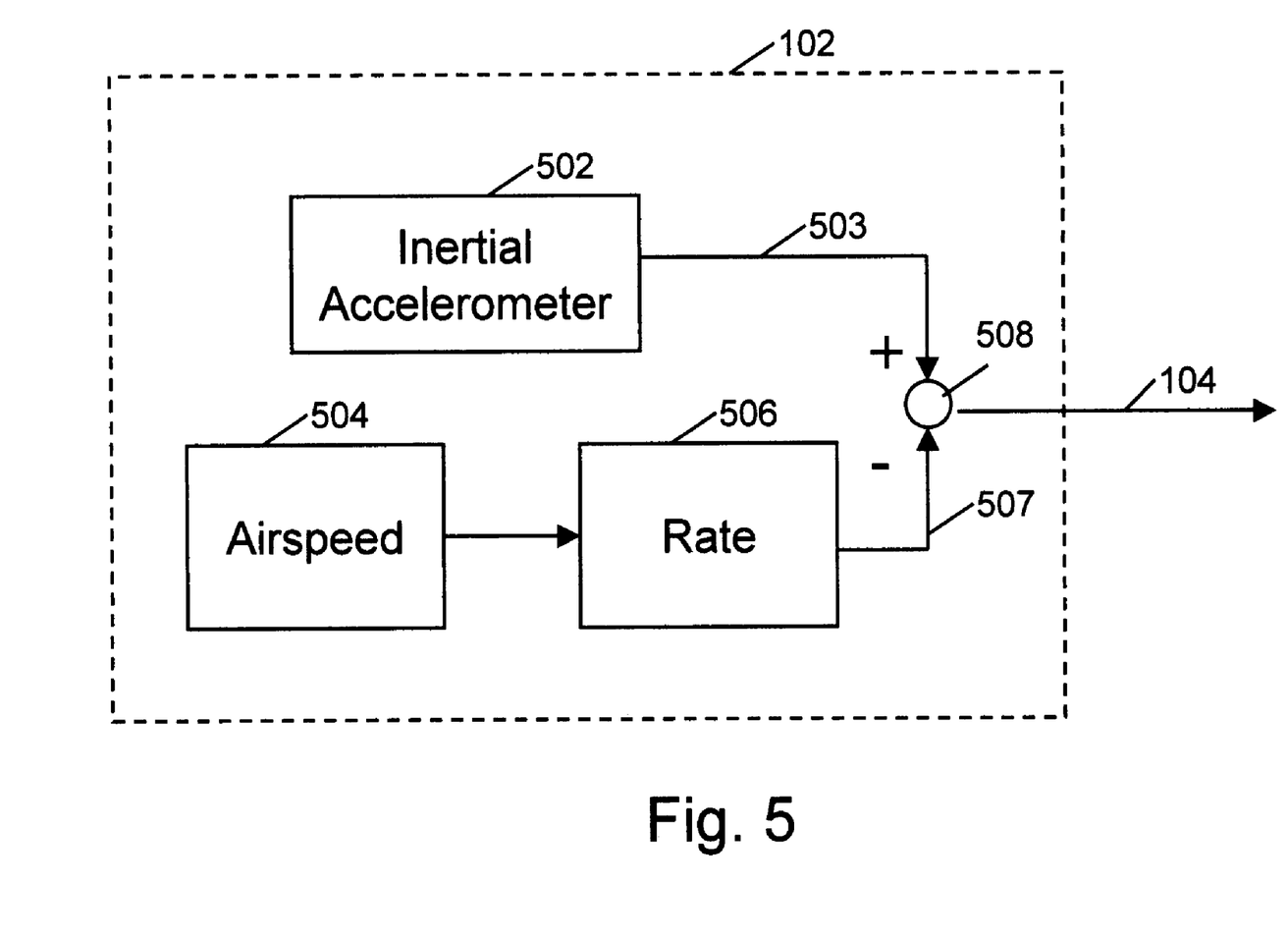
FIG. 5 is an exemplary block diagram of an alternate vertical information source.

FIG. 5 is an exemplary block diagram of an alternate vertical information source 102. The vertical information 104 resulting from the source of FIG. 5 is pitch attitude. When the source of FIG. 5 is utilized in the system of FIG. 1, the filtered signal 114 that results is a gyro stabilized pitch attitude. Referring to FIG. 5, an inertial accelerometer 502 is used to sense tilt in the pitch axis, which is pitch attitude. The inertial accelerometer 502, however, is also sensitive to axial acceleration. An alternate axial acceleration signal 507 is used to remove the axial acceleration component of the inertial accelerometer signal 503. As shown in FIG. 5, an airspeed sensor 502, generates an airspeed signal that may be differentiated in a rate network 506 to derive an axial acceleration signal 507 that is not sensitive to pitch attitude. Alternatively, GPS velocity may be used to generate axial acceleration. Axial acceleration 507 is subtracted from inertial acceleration 503 at a summing node 508 to derive a pitch attitude signal 104. Alternative inertial acceleration sensors 502 include mass and spring type accelerometers, piezoresistive acceleromentes, pendulum based accelerometers, and fluid potentiometer type sensors.

Figure 6:
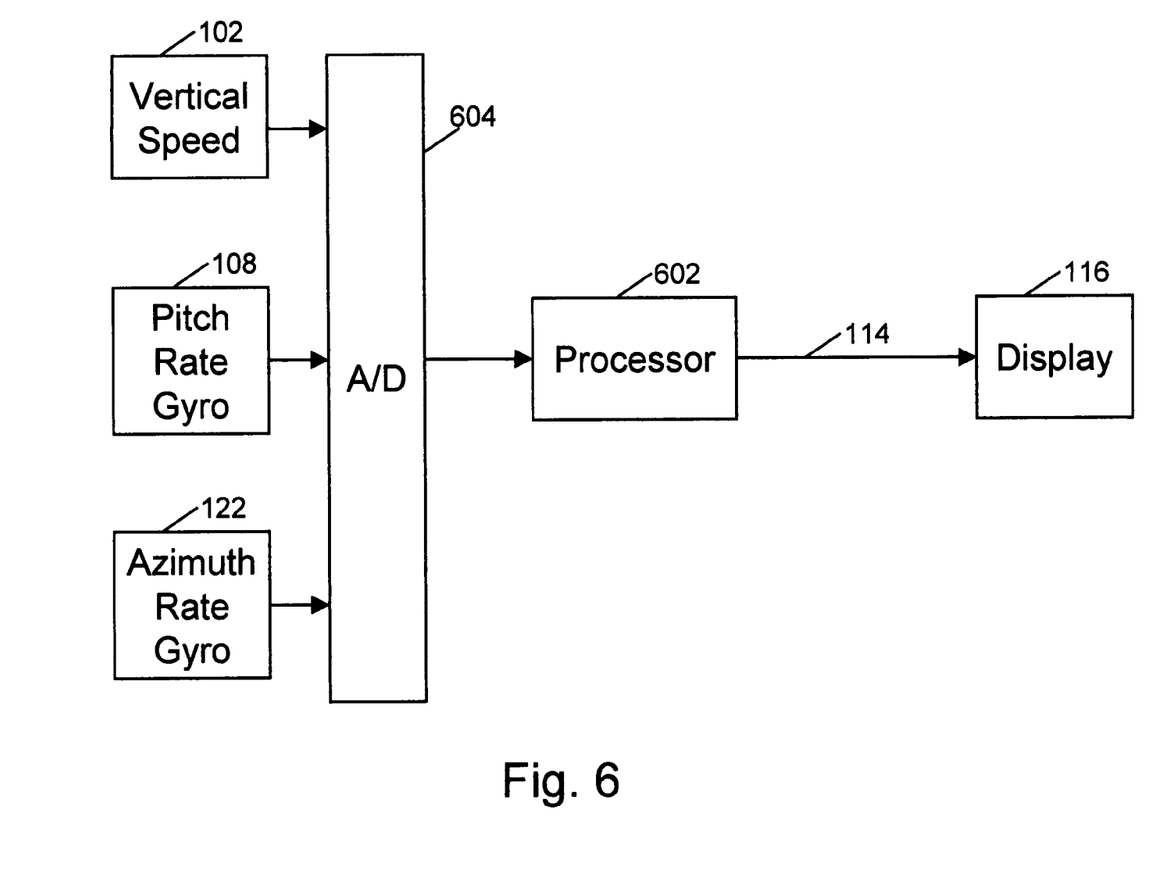
FIG. 6 illustrates a processor based embodiment of the present invention.

The system of FIG. 1 utilizes rate gyro 108, 122 based pitch attitude information to stabilize the inertial pitch attitude vertical information 104 derived from the sensor of FIG. 5. The pitch attitude signal of FIG. 5 has good absolute knowledge of pitch attitude, but may include noise due to transient response in turbulence. By using the pitch attitude sensor of FIG. 5 in the system of FIG. 1, the filtered output 114 of FIG. 1 is a gyro stabilized pitch attitude signal. The gyro stabilized pitch attitude signal 114 may be used to drive a display 116 for the pilot may be used in an autopilot FIG. 6 illustrates a processor based embodiment of the present invention. Referring to FIG. 6, the vertical speed 102, pitch rate 108, and azimuth rate 122 signals are converted to digital using an A/D subsystem 604 and processed by a processor 602. The result 114 is displayed 116 or used in an autopilot (not shown). The system of FIG. 1 may be implemented in the processor 604 by using sampled data filters such as IIR or FIR filters as are known in the art. The display 116 may be an electromechanical display or may be a computer graphic display such as an LCD, plasma display, or other computer graphic display known in the art. Alternatively, the system may be configured and partitioned into analog and digital subsystems at the convenience of the designer as is known in the art.

Figure 7:
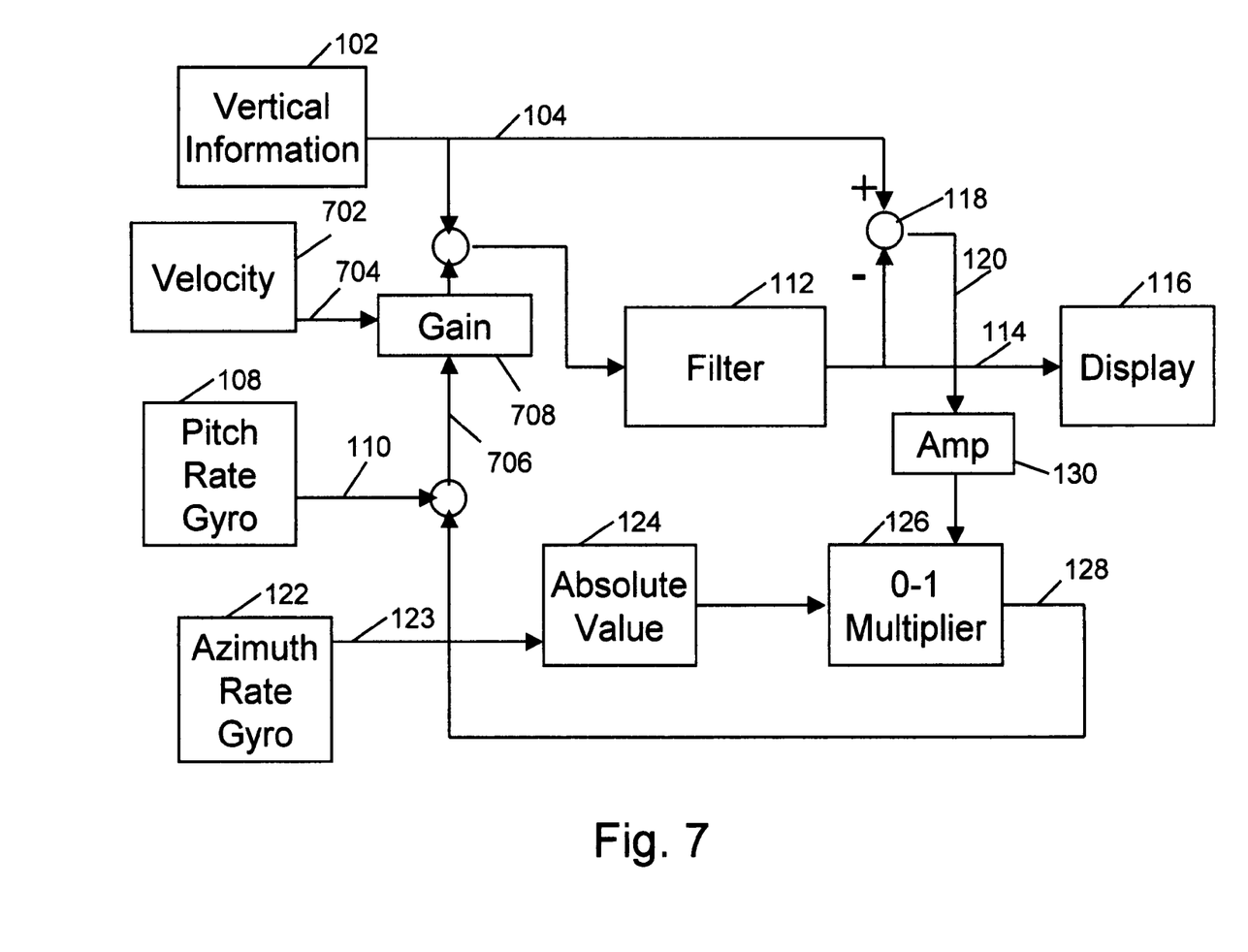
FIG. 7 illustrates an exemplary embodiment that includes velocity information.

FIG. 7 illustrates an exemplary embodiment that includes velocity information. The magnitude of the pitch rate gyro signal is adjusted so that the pitch attitude signal resulting from filtering (integrating) the pitch rate gyro signal is equal to the vertical velocity expected to result from the pitch attitude signal. Vertical velocity, however, is substantially proportional to the aircraft forward velocity. Thus, to accommodate a wide range of forward velocity, it may be desirable to provide a correction for variation in forward velocity. For many aircraft, it may be sufficient to use a fixed gain value based on a nominal cruise velocity for scaling the pitch rate gyro signal, however, for some high performance aircraft the addition of a correction signal may be desirable.

Referring to FIG. 7, a velocity sensor 702 produces a velocity signal 704 that is used to adjust the magnitude of the corrected pitch rate gyro signal 706 by controlling the gain of gain stage 708. The gain stage 708 may include a multiplier, controllable gain amplifier, multiply operation, or other multiply function. The velocity signal may be derived from airspeed or from GPS velocity.

Instrument

Figure 8:
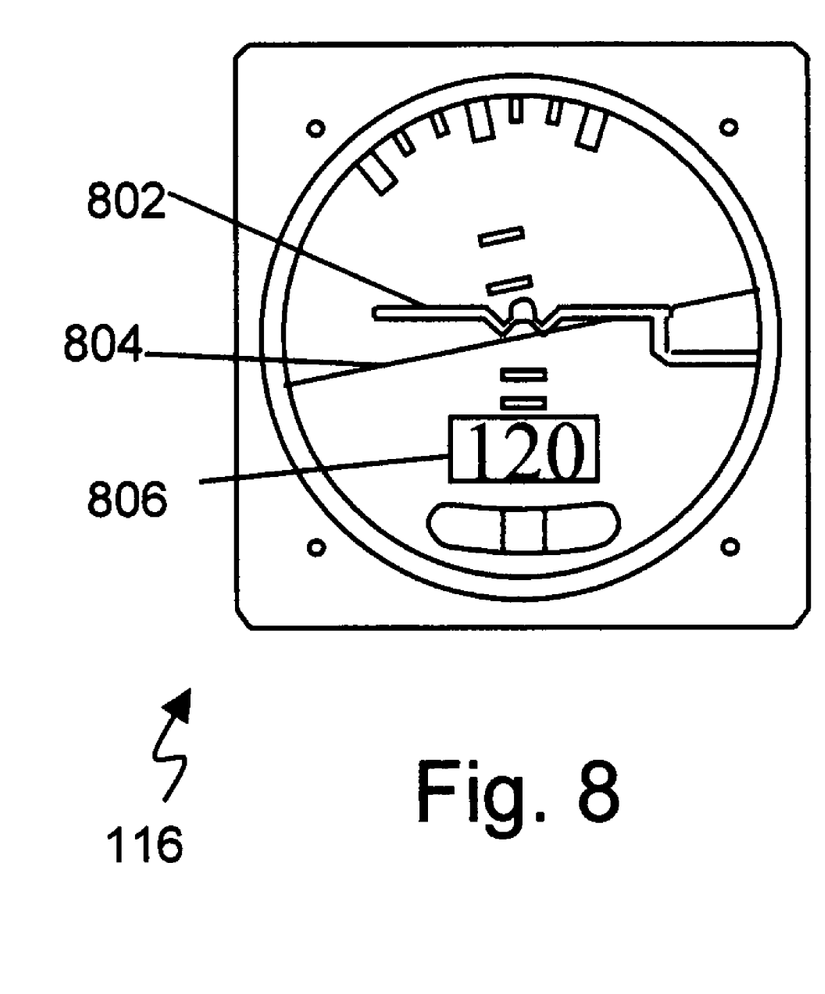
FIG. 8 illustrates an exemplary embodiment of an attitude direction indicator (ADI) instrument in accordance with the present invention.

In one embodiment of the invention, the gyro enhanced vertical speed signal 114 is used to drive a display 116. An exemplary display 116 is shown in FIG. 8. Referring to FIG. 8, the display 116 may be an electromechanical display. The display 116 may show an airplane 802 that moves vertically in the foreground relative to a horizon line 804 in the background. Alternatively, the horizon line 804 may move relative to a fixed airplane 802 in the foreground. Typically, the airplane 802 remains fixed in roll angle relative to the aircraft (instrument) flame. Alternatively, the display may be a computer graphic display showing an airplane 802 and a horizon line 804.

The instrument showing gyro enhanced vertical speed 114 may include other information as well. In one embodiment, the azimuth rate gyro 122 is inclined and used to drive a turn and bank display which rotates the horizon line 804. The azimuth rate gyro may also be used to for the correction signal 124 for the gyro enhanced vertical speed 114. Both displays may be in the same instrument. The turn and bank display may be used to rotate the horizon line 804 in roll behind the moving airplane 802 which shows the gyro enhanced vertical speed 114. The same instrument may also show heading or GPS course 806 as a digital number or moving tape, or may show altitude as a number or moving tape (not shown.)

With gyro enhanced vertical speed 802, turn and bank 804, and heading information 806 in the same instrument 116, the pilot may use the combined instrument as the primary flight control instrument, i.e., the pilot focus greatest attention on the combined instrument to maintain level flight, enter and maintain turns, terminate turns, ascend or descend to a desired altitude. If altitude is displayed separately, only occasional glances to the altimeter are necessary.

FIG. 8 illustrates an exemplary embodiment of an attitude direction indicator (ADI) instrument in accordance with the present invention. Referring to FIG. 8, the instrument is showing a climbing right turn at a heading of 120 degrees. Gyro enhanced vertical speed is indicated by an airplane FIG. 802 that moves vertically in the display in response to the gyro enhanced vertical speed signal, while remaining fixed relative to the frame in roll. Azimuth rate is indicated by a rotation of the horizon line 804 proportional to the azimuth rate. The rotation of the horizon line is suggestive of roll angle, but not strictly indicative of roll angle. The azimuth rate gyro 122 used for turn and bank is typically inclined at a 20 to 40 degree angle to show a turn upon beginning the roll into the turn. A heading angle is indicated numerically 802. In one embodiment, the heading angle is derived from GPS course information. The instrument displays sufficient information to maintain stable pitch and roll axes and to fly a given course direction.

Autopilot

In one embodiment of the invention, the gyro enhanced vertical speed signal 114 is incorporated into an autopilot. When used in an autopilot, the gyro enhanced vertical speed signal 114 may also drive an optional display 116, if so configured.

In one autopilot embodiment, a vertical speed command signal is summed with the vertical speed sensor signal 104 to produce a vertical speed error signal. The vertical speed error signal is used in place of the vertical speed sensor signal 104 of FIG. 1. The resulting gyro enhanced vertical speed signal 114 is used to command the pitch axis servo system in the aircraft.

In a second autopilot embodiment, an altitude error signal is summed with the vertical speed sensor signal 104 to produce a vertical speed error signal. The vertical speed error signal is used in place of the vertical speed sensor signal 104 of FIG. 1. The resulting gyro enhanced vertical speed signal 114 is used to command the pitch axis servo system in the aircraft. The altitude error signal may be generated as the difference between a pilot selected altitude and the measured altitude. In one embodiment the pilot may dial in a selected altitude using a selector. In another embodiment, the pilot may select the present altitude by pressing a button that stores the current altitude as the selected altitude.

Variations

The preferred embodiments may be varied by one skilled in the art based on the teachings herein. Such variations may include, but are not limited to such operations as moving functions through summing nodes, such as filtering before summing with multiple filters vs. filtering after summing with a single filter.

In one embodiment, the gain control is a nominal value for zero difference signal and varied around the nominal value by the difference signal. The nominal coupling is equivalent to a fixed coupling from the absolute value to the summing junction with a readjustment of the nominal value of the gain control.

Pitch attitude information may be derived from a separate integration of a pitch rate gyro and the result combined with vertical information by using complementary filter techniques. Alternatively, pitch attitude from a vertical gyro may be combined with vertical information using complementary filter techniques.

The display may be electromechanical, computer graphic, numeric, or other display as may be devised for pilots. The symbolic representation may be an airplane relative to a horizon line or other icon or symbol as may be devised to communicate the information to a pilot.

The system may include digital or analog components or a mixture of digital and analog components and digital processing may be substituted for analog processing as is known by one skilled in the art.

CONCLUSION

While particular embodiments of the invention have been described, it will be understood, however, that the invention is not limited thereto, since modifications may be made by those skilled in the art, particularly in light of the foregoing teachings. It is, therefore contemplated by the appended claims to cover any such modifications that incorporate those features or those improvements which embody the spirit and scope of the present invention.

What is claimed is:

1. A flight instrument comprising:
   a vertical speed sensor, said vertical speed sensor producing a vertical speed signal;
   a pitch axis rate gyro and an azimuth rate gyro, said pitch axis rate gyro producing a pitch axis rate signal;
   said azimuth rate gyro responsive, at least in part, to azimuth rate;
   a combination processor, said combination processor combining the vertical speed signal and the pitch axis rate signal to produce a gyro enhanced vertical speed signal;
   a display comprising a horizon line wherein a tilt angle of the horizon line is responsive to the azimuth rate gyro; and
   an aircraft reference marker; wherein said aircraft reference marker is disposed vertically relative to said horizon line by a vertical distance, and said vertical distance between said aircraft reference marker and said horizon line is representative of said gyro enhanced vertical speed signal.

2. The flight instrument of claim 1, wherein the aircraft reference marker comprises an airplane symbol.

3. The flight instrument of claim 1, wherein the gyro enhanced vertical speed signal includes a correction based on said azimuth rate gyro, said correction for reducing an azimuth rate response of said pitch axis rate gyro.

4. The flight instrument of claim 1, wherein the display comprises a numeric display positioned vertically with respect to said horizon line within the horizontal extents of said horizon line, and the numeric display displays a numeric value representing the gyro enhanced vertical speed signal.

5. A method for displaying gyro enhanced vertical speed information comprising:
   providing vertical speed information;
   providing vertical axis information based on rate gyro information, said rate gyro information including pitch rate information produced by a pitch rate gyro and azimuth rate information produced by an azimuth rate gyro;
   combining the vertical speed information and the vertical axis information to produce said gyro enhanced vertical speed information; and
   displaying a horizon line and an aircraft reference, said horizon line and said aircraft reference having a vertical separation representative of said gyro enhanced vertical speed information.

6. The method of claim 5, wherein the gyro enhanced vertical information includes a correction based on the difference between the vertical speed information and the gyro enhanced vertical speed information, said difference scaled according to azimuth rate information.

7. The method of claim 5, wherein the pitch rate information is adjusted in accordance with the azimuth rate information.

8. The method of claim 5, further including a forward speed sensor producing forward speed information, wherein a magnitude of said gyro information is adjusted substantially proportional to said forward speed information.

9. The flight instrument of claim 1, wherein said gyro enhanced vertical speed signal is responsive to said vertical speed signal in a long term and responsive to said pitch axis rate signal in a short term.

10. The flight instrument of claim 1, wherein said aircraft reference is fixed vertically relative to said flight instrument.

11. The flight instrument of claim 1, wherein said horizon line is fixed vertically relative to said flight instrument.

* * * * *